(12) United States Patent  
Kleppinger et al.

(10) Patent No.: US 11,704,197 B2
(45) Date of Patent: Jul. 18, 2023

(54) BASIC INPUT/OUTPUT SYSTEM (BIOS) DEVICE MANAGEMENT

(71) Applicant: NCR Corporation, Atlanta, GA (US)

(72) Inventors: Michael Andrew Kleppinger, Buford, GA (US); Christopher Robert Davis, Chamblee, GA (US); Jeffrey R. Garner, Buford, GA (US); Cynthia D. Nova, Alpharetta, GA (US)

(73) Assignee: NCR Corporation, Atlanta, GA (US)

( * ) Notice: Subject to any disclaimer, the term of this patent is extended or adjusted under 35 U.S.C. 154(b) by 18 days.

(21) Appl. No.: 16/660,321

(22) Filed: Oct. 22, 2019

(65) Prior Publication Data

US 2021/0117272 A1 Apr. 22, 2021

(51) Int. Cl.
*G06F 11/14* (2006.01)
*G06F 9/4401* (2018.01)

(52) U.S. Cl.
CPC ........ *G06F 11/1417* (2013.01); *G06F 9/4406* (2013.01); *G06F 11/1438* (2013.01); *G06F 11/1456* (2013.01); *G06F 11/1461* (2013.01); *G06F 11/1469* (2013.01)

(58) Field of Classification Search
CPC .. G06F 11/14; G06F 11/1417; G06F 11/1456; G06F 11/1461; G06F 11/1469
See application file for complete search history.

(56) References Cited

U.S. PATENT DOCUMENTS

| | | | | |
|---|---|---|---|---|
| 5,793,943 A * | 8/1998 | Noll | G06F 11/1417 | 714/11 |
| 5,835,102 A * | 11/1998 | Monroe, III | G06F 11/1469 | 345/545 |
| 5,870,520 A * | 2/1999 | Lee | G11C 29/765 | 714/6.12 |
| 6,018,806 A * | 1/2000 | Cortopassi | G06F 8/65 | 714/6.31 |
| 6,122,733 A * | 9/2000 | Christeson | G06F 9/4401 | 713/2 |
| 7,356,679 B1 * | 4/2008 | Le | G06F 9/45558 | 713/1 |
| 7,600,105 B2 * | 10/2009 | Tseng | G06F 9/441 | 713/1 |
| 8,161,322 B2 * | 4/2012 | Gough | G06F 11/1004 | 714/15 |

(Continued)

*Primary Examiner* — Kamini B Patel
(74) *Attorney, Agent, or Firm* — Schwegman Lundberg & Woessner, P.A.

(57) ABSTRACT

A computing device includes a hardware switch that is activated when a primary Basic Input/Output System (BIOS) of a first BIOS chip of the device fails to load an Operating System (OS) image from an OS partition of a hard drive. The switch passes control to a backup BIOS that executes from a backup BIOS chip. The backup BIOS loads a recovery image from BIOS recovery partition of the hard drive, which causes a reflash application to execute from the recovery image. Reflash application obtains a recovery BIOS from the BIOS recovery partition of the hard drive, reflashes/writes the recovery BIOS onto the first BIOS chip and reboots the device. Following reboot of the device, recovery BIOS loads the OS image from the OS partition, and recovery BIOS becomes the primary BIOS on the first BIOS chip of the device.

17 Claims, 3 Drawing Sheets

(56) References Cited

U.S. PATENT DOCUMENTS

| | | | |
|---|---|---|---|
| 2002/0147941 A1* | 10/2002 | Gentile | G06F 11/1417 714/36 |
| 2003/0028800 A1* | 2/2003 | Dayan | G06F 11/1433 726/34 |
| 2003/0163753 A1* | 8/2003 | Lu | G06F 11/1417 714/2 |
| 2005/0015652 A1* | 1/2005 | Han | G06F 11/1458 714/6.11 |
| 2006/0064571 A1* | 3/2006 | Tseng | G06F 9/441 713/1 |
| 2007/0174704 A1* | 7/2007 | Shih | G06F 11/3664 714/36 |
| 2008/0184023 A1* | 7/2008 | Shih | G06F 11/1417 713/2 |
| 2008/0301424 A1* | 12/2008 | Barajas | G06F 9/4401 713/2 |
| 2011/0138220 A1* | 6/2011 | Gough | G06F 11/1004 714/5.1 |
| 2011/0191571 A1* | 8/2011 | Perusse, Jr. | G06F 9/00 713/1 |
| 2012/0023320 A1* | 1/2012 | Chen | G06F 11/0793 713/2 |
| 2012/0079260 A1* | 3/2012 | Yin | G06F 11/1417 713/2 |
| 2014/0006804 A1* | 1/2014 | Tkacik | G06F 21/53 713/192 |
| 2018/0039546 A1* | 2/2018 | Lambert | G06F 11/1417 |
| 2019/0303171 A1* | 10/2019 | Lin | G06F 13/1668 |

* cited by examiner

BASIC INPUT/OUTPUT SYSTEM (BIOS) DEVICE MANAGEMENT

BACKGROUND

A device Basic Input/Output System (BIOS) is a set of software instructions that are embedded directly on a device's chip (installed on the motherboard). In general, the BIOS is executed when the device is powered on or booted and performs functions to: test the device's hardware to make sure there are no errors before loading the Operating System (OS) into memory, locate or process a bootstrap loader that loads the OS into memory, load low-level drivers for control over the device's hardware, and initiate a configuration process that permits hardware and system settings to be user-controlled.

If the BIOS itself becomes corrupted in some manner, the motherboard of the device requires replacement. This makes sense because the device cannot properly load the OS when the BIOS is corrupted. BIOS modifications are possible through a flashing process as most devices include a flash BIOS, which is special software that permits the BIOS to be updated to fix problems on the device or add new features to the motherboard. A flash BIOS is capable of directly changing the software for the BIOS on the motherboard of the device and requires rebooting of the device following the flashing.

During flashing, the BIOS can become corrupt, such that it is no longer possible to successfully boot the device with the OS; essentially rendering the device unusable to the user.

SUMMARY

In various embodiments, methods and a device for BIOS device management are presented.

According to an aspect, a method for BIOS device management is presented. Specifically, a processor executes a backup Basic Input/Output System BIOS from a backup BIOS chip of a device. The backup BIOS causes the processor to load a recovery image from a BIOS recovery partition of a hard drive for the device. The processor executes a reflash application from the recovery image. The reflash application causes the processor to obtain a recovery BIOS from the BIOS recovery partition of the hard drive. The reflash application causes the processor to flash the recovery BIOS onto a primary BIOS chip of the device as a primary BIOS for the device. The reflash application causes the processor to reboot the device, which causes the processor to execute the recovery BIOS as the primary BIOS from the primary BIOS chip.

DETAILED DESCRIPTION

Figure 1:
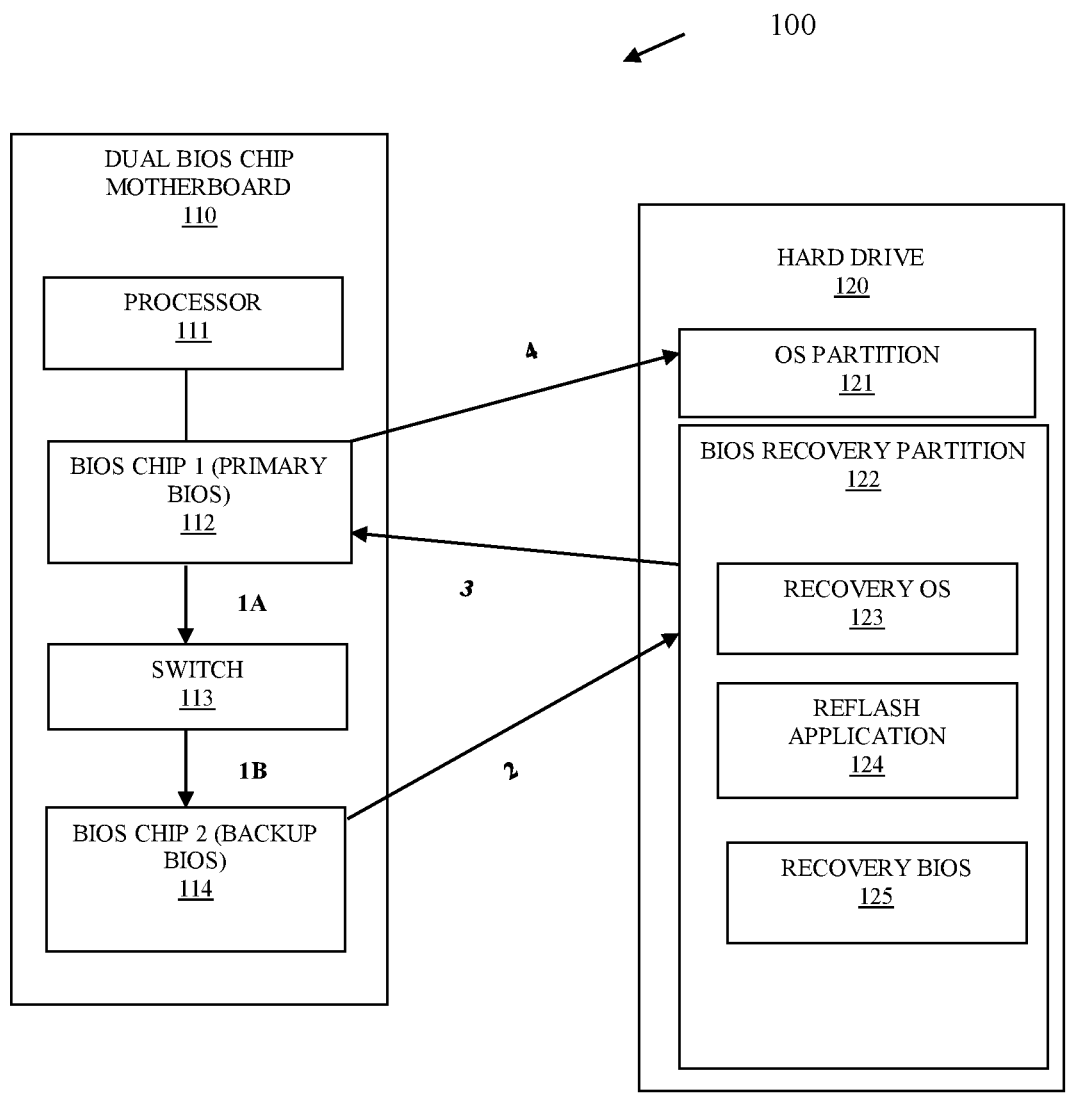
FIG. 1 is a diagram of a device for BIOS device management, according to an example embodiment.

FIG. 1 is a diagram of a device 100 for BIOS device management, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of BIOS device management presented herein and below.

The device 100 is configured to seamlessly restore a corrupted BIOS on a motherboard 110 of the device 100 and boot the device 100 back from its OS partition 121 without any special processes being required within the original OS image included within OS partition 121 and without any user action being required. This permits device 100 to boot up and operate in a normal condition and state with its application processing environment from the OS partition 121 when the primary BIOS 112 becomes corrupted for any reason (based on user-error causing an errant reflash of the primary BIOS 112 that corrupts primary BIOS 112, based on a user-application within OS image of OS partition 121 causing an errant reflash of the primary BIOS 112 that corrupts primary BIOS 112, based on power outages during a boot that may have corrupted primary BIOS 112, and any other reason). This ensures high-availability (HA) of device 100 and the user's application environment from OS partition 121 and provides seamless failover support for BIOS corruptions on device 100.

As used herein "user" and "customer" may be used synonymously and interchangeably referring to an operator of device 100.

As used herein "application environment," "OS image," and "application image" may be used synonymously and interchangeably referring to an OS, applications, resource configuration settings, and data that is contained within OS partition 121 and is loaded, processed, and accessible to process by processor 111 when the device 100 boots up using primary BIOS chip 112 without failure or some type of fault condition.

The device 100 includes a dual BIOS chip motherboard 110 and a hard drive 120. The dual BIOS chip motherboard 110 includes: a processor 111, a primary BIOS chip 112 (may also be referred to herein as "primary BIOS 112"), a hardware switch 113, and a second backup BIOS chip 114 (may also be referred to herein as "backup BIOS 114"). The hard drive 120 includes an OS partition 121 (having an OS image/application environment of the user), a BIOS recovery partition 122 (having a recovery image for device 100) comprising a recovery OS 123, a reflash application 124 and a recovery BIOS 125.

In a normal situation where there is no corruption of primary BIOS 112, processor 111 executes primary BIOS 112 (from BIOS chip 1) on during startup or a boot process causing the processor 111 to load the OS (from OS partition 121) into memory with the user's application image of the user (OS image loaded into memory). The user then accesses software resources, data resources, and hardware resources normally on device 100 and user's applications process as configured, scheduled, or directed by the user on device 100 through processor 111.

In one conventional situation, should a device BIOS become corrupted for any reason, the only remedy for the user would be to replace the motherboard to fix the corrupted BIOS. Essentially, the device becomes unusable for the user's purposes and requires replacement.

However, with the teachings provided herein, a hardware switch 113 detects the inability of OS Partition 121 to load user application image (labeled 1A in FIG. 1) when processor 111 attempts to execute primary BIOS 112 during a boot or power on of device 100, switch 113 automatically causes processor 111 to obtain and process the backup BIOS 114 (from BIOS chip 2). Backup BIOS 114 causes the processor 111 to load a recovery image having recovery OS 123 from BIOS recovery partition 122. The recovery OS 123 causes reflash application 124 to be executed by processor 111 (labeled 2 in FIG. 1). Reflash application 124 causes processor 111 to obtain an original and known good version of the primary BIOS 111 from BIOS recovery partition 122 as recovery BIOS 125. BIOS recovery partition 122 is a hidden partition on hard drive 120 and inaccessible from any OS image (user application image) loaded from OS partition 121. Reflash application 124 then causes processor 111 to reflash (or flash) BIOS chip 1 112 with the recovery BIOS 125, such that original primary BIOS 112 becomes recovery BIOS 125. Reflash application 124 then causes processor 111 to force a reboot (boot) of device 100. On reboot (boot), recovery BIOS 125 is now the original/primary and good working version of the original corrupted version of BIOS 112 on BIOS chip 1; as a result, processor 111 executes the restored primary BIOS 112 and loads OS partition 121 (labeled 4 in FIG. 1). The user application image with user OS, application, and resources obtained from OS partition 121 are now available for processing on processor 111 with full user access.

In a second conventional situation, some devices do permit a dual BIOS chip motherboard that will boot from a backup BIOS chip via a switch. However, these approaches boot from the user's normal OS partition. As a result, these approaches require the user OS partition to include and maintain a separate process that detects booting during processing of the backup BIOS that would then reflash the first BIOS chip with the proper backup BIOS and reboot the device. The problem with this approach is that often vendors or device manufacturers/distributors have no control over the user's application image loaded from the user's OS partition, so as to ensure that user is supporting a backup BIOS and a necessary re-flashing process. Furthermore, the reflash process can be interfered with as the user's application image is being loaded from the OS partition, which could corrupt the primary BIOS chip during reflash. Moreover, any maintained backup BIOS would be stored on the user's OS partition, which means it is capable of itself being corrupted by the user or user's applications. Still further, some users may not even install or use, or may intentionally/ unintentionally delete, specialized reflash (flash) processes within their OS partition, in which case the device becomes unusable and the motherboard needs replaced.

These problems associated with existing dual BIOS chip motherboard approaches are remedied by device 100 because there is no reliance on the user to maintain, support, and properly configure and synchronize the execution of a reflash application 124 within OS partition 121. BIOS chip 2 includes its own BIOS recovery partition 122, which includes a limited functionality recovery OS 123, intentionally minimized with limited resource loading. During the load of the limited functionality OS 123, reflash application 124 is automatically executed while backup BIOS 114 executes. The recovery BIOS 125 for the primary BIOS 112 exists on the BIOS recovery partition 122 accessible to BIOS chip 2 but not to BIOS chip 1. The reflash is made to BIOS chip 1. After reflash, device 100 is automatically rebooted causing the restored primary BIOS 112 to execute by processor 111 and load from OS partition 121 with the user's application image as a proper OS image. This completely removes dependencies and burdens on the user to maintain a backup BIOS and any specialized reflash processes associated with the backup BIOS from OS partition 121 or within user application image ensuring that the user or user' applications do not process things in the incorrect order, with incorrect synchronization, or unintentionally corrupt the backup BIOS.

By compartmentalizing the OS partition 121 having user's application image and BIOS recovery partition 122, such that the two partitions 121 and 122 are completely isolated from one another with access BIOS recovery partition 122 only available to BIOS chip 2, the device 100 becomes completely independent of the user's OS partition 121 having user's application image. This is significant because most device manufacturers and device distributors do not have any control over what the user chooses to include or remove when they build and process their application image contained in OS partition 121. In addition, since the partition 122 is created specifically for re-flashing (flashing) the primary BIOS 112 for access as a restored BIOS chip 1, there is no concern about user's applications/ resources processing within a loaded application image from OS partition 121 interfering with the reflash processing performed by reflash application 124. The processor 111 boots device 100 from partition 122 (at 2) when BIOS chip 2 is loaded and is provided control from switch 113 (at 1B), processor 111 then executes backup BIOS 114 causing reflash application 124 to reflash the recovery BIOS 125 on BIOS chip 1 as a newly restored primary BIOS 112 at 3 (using the protected and isolated BIOS recovery partition 122), and then device 100 is rebooted back to working condition with processor 111 executing restored primary BIOS 112 and loading the user's application image from OS partition 121 on device 100 (at 4).

Device 100 removes dependencies upon user configuration, support, and application environment/image (contained on OS partition 121) to maintain HA of device 100. This saves a tremendous amount of support and hardware expense because when the BIOS is corrupted or a backup BIOS process is not properly configured and running, the entire motherboard needs to be replaced. Device 100 also removes a requirement of the user to maintain and support device-based backup services and is completely self-managing and self-sustaining through switch 113, backup BIOS 114, BIOS recovery partition 122 with recovery OS 123, reflash application 124, and recovery BIOS 125.

In an embodiment, the device is a Self-Service Terminal (SST), a Point-Of-Sale (POS) terminal, an Automated Teller Machine (ATM), a tablet, a phone, a desktop computer, a laptop computer, a server, or an Internet-of-Things (IoTs) device.

These and other embodiments are now discussed with reference to FIGS. 2-3.

Figure 2:
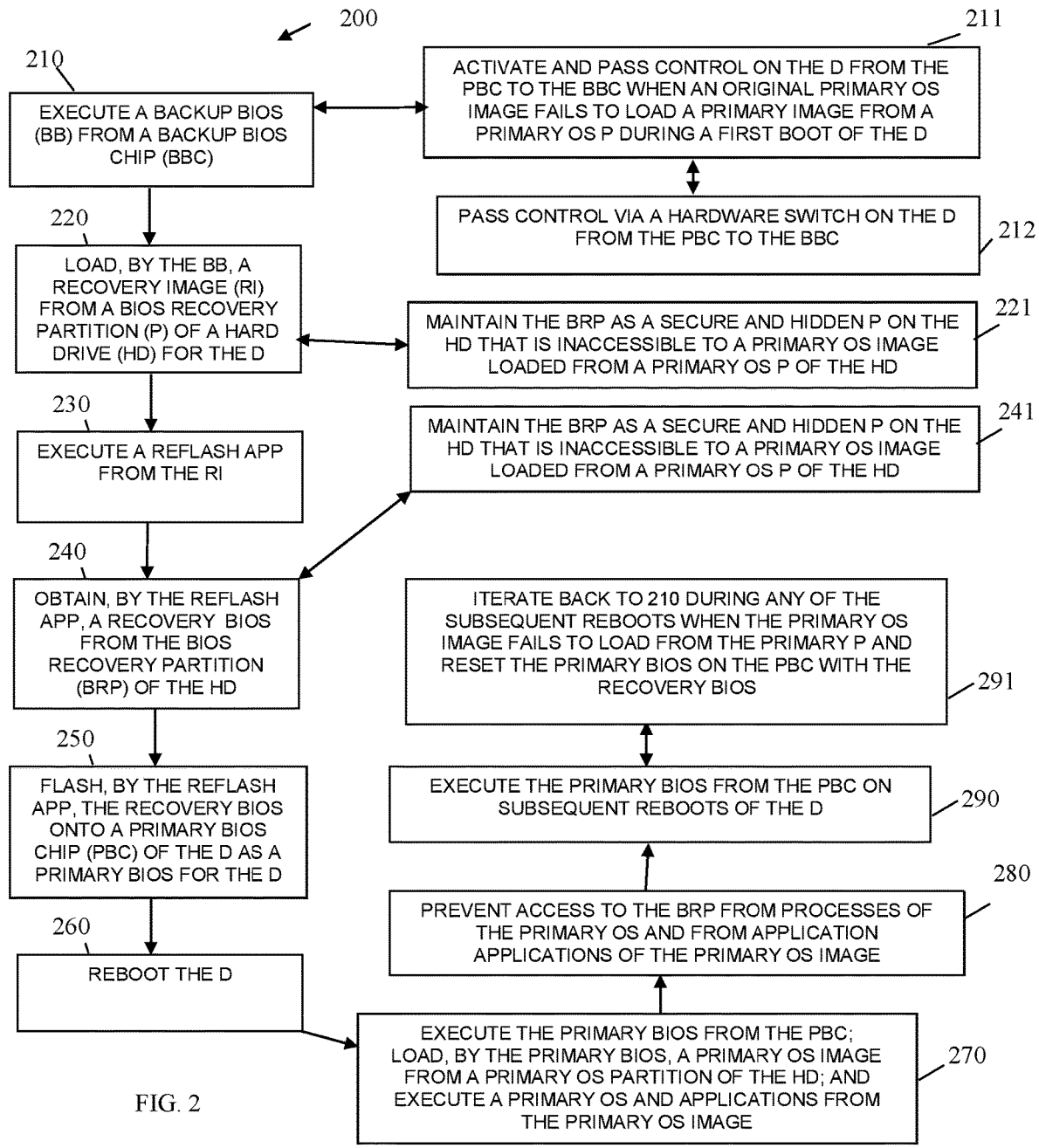
FIG. 2 is a diagram of a method for BIOS device management, according to an example embodiment.

FIG. 2 is a diagram of a method 200 for BIOS device management, according to an example embodiment. The software module(s) that implements the method 200 is referred to as a "BIOS restorer." The BIOS restorer is implemented as executable instructions programmed and residing within memory and/or a non-transitory computer-readable (processor-readable) storage medium and executed by one or more processors of a device. The processor(s) of the device that executes the BIOS restorer are specifically configured and programmed to process the BIOS restorer. The BIOS restorer does not require a network connection during operation although the device that executes the BIOS restorer may or may not have one or more network connections. Any network connections can be wired, wireless, or a combination of wired and wireless.

In an embodiment, the device that executes the BIOS restorer is device 100. In an embodiment, device 100 is an SST, a POS terminal, an ATM, a tablet, a phone, a desktop computer, a laptop computer, a server, or an IoTs device.

In an embodiment, the BIOS restorer is all of or some combination of: switch 113, backup BIOS 114, recovery OS 123, reflash application 124, and recovery BIOS 125 from a BIOS recovery partition 122 as discussed above with the FIG. 1.

At 210, the BIOS restorer executes a backup BIOS from a backup BIOS chip of the device.

In an embodiment, at 211, the BIOS restorer activates and passes control on the device from a primary BIOS chip to the recovery BIOS chip when an original primary OS image fails to load a primary OS image from a primary OS partition during a first boot of the device.

In an embodiment of 211 and at 212, the BIOS restorer passes control via a hardware switch on the device from the primary BIOS chip to the backup BIOS chip.

At 220, the recovery BIOS loads a recovery image from a BIOS recovery partition of a hard drive for the device.

In an embodiment, at 221, the BIOS restorer maintains the BIOS recovery partition as a secure and hidden partition on the hard drive of the device that is inaccessible to a primary OS image loaded from a primary OS partition of the hard drive.

At 230, the BIOS restorer executes a reflash application from the recovery image.

At 240, the BIOS reflash application obtains a recovery BIOS from the BIOS recovery partition on the hard drive.

In an embodiment, at 241, the reflash application maintains the BIOS recovery partition as a secure and hidden partition on the hard drive of the device that is inaccessible to a primary OS image loaded from a primary OS partition of the hard drive.

At 250, the reflash application flashes (stores or writes) the recovery BIOS onto a primary BIOS chip of the device as a primary BIOS for the device.

At 260, the reflash application reboots the device.

In an embodiment, at 270, the BIOS restorer executes the primary BIOS from the primary BIOS chip of the device. The primary BIOS loads a primary OS image from a primary partition of the hard drive. A primary OS and applications are executed on the primary chip from the primary OS image.

In an embodiment of 270, at 280, the BIOS restorer prevents access to the BIOS recovery partition from processes of the primary OS and from the applications of the primary OS image.

In an embodiment of 280, at 290, the BIOS restorer executes the primary BIOS from the primary BIOS chip on subsequent reboots of the device.

In an embodiment of 290 and at 291, the BIOS restorer iterates back to 210 to execute the backup BIOS from the backup BIOS chip during any of the subsequent reboots of the device when the primary OS image fails to load from the primary OS partition, resulting in resetting the primary BIOS on the primary BIOS chip with the recovery BIOS during each iteration back to 210.

Figure 3:
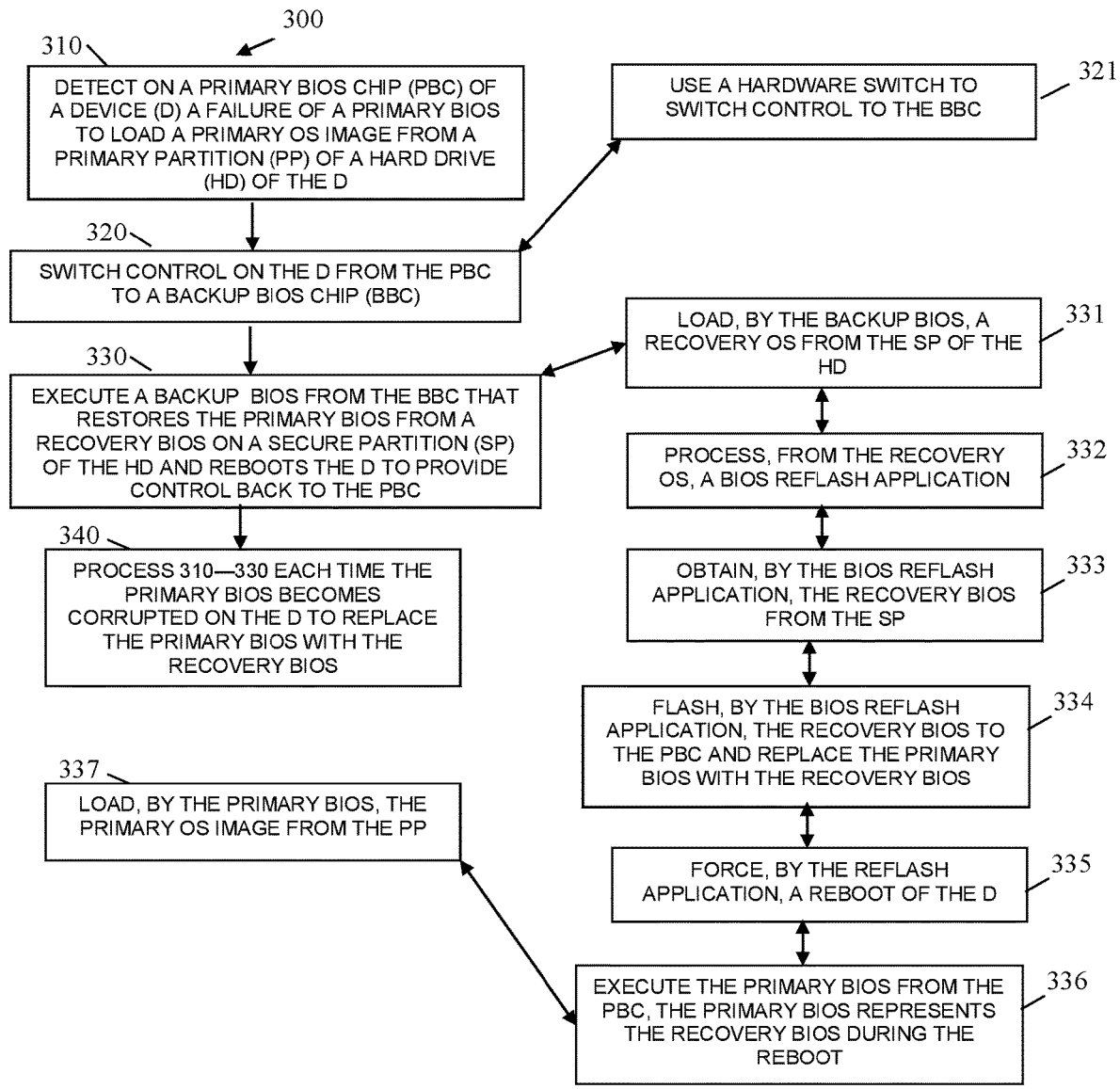
FIG. 3 is a diagram of another method BIOS device management, according to an example embodiment.

FIG. 3 is a diagram of another method 300 for BIOS device management, according to an example embodiment. The software module(s) that implements the method 300 is referred to as a "BIOS manager." The BIOS manager is implemented as executable instructions programmed and residing within memory and/or a non-transitory computer-readable (processor-readable) storage medium and executed by a device. The processors that execute the BIOS manager are specifically configured and programmed to process the BIOS manager. The BIOS manager does not require any network connection during its processing. However, the device that executes the BIOS manager may or may not have one or more network connections. Any network connections to the device can be wired, wireless, or a combination of wired and wireless.

In an embodiment, the device that executes the BIOS manager is device 100. In an embodiment, device 100 is an SST, a POS terminal, an ATM, a tablet, a phone, a desktop computer, a laptop computer, a server, or an IoTs device.

In an embodiment, the BIOS manager is all of or some combination of: backup BIOS 114, recovery OS 123, reflash application 124, a restored primary BIOS 112 from a recovery BIOS 125 from the BIOS recovery partition 122 as discussed above with the FIG. 1 and/or the method 200.

The processing of the BIOS manager as shown in FIG. 3 represents another and in some ways enhanced perspective of the method 200 shown in the FIG. 2.

At 310, the BIOS manager detects on a primary BIOS chip of the device a failure of a primary BIOS to load a primary OS image from a primary partition of a hard drive of the device.

At 320, the BIOS manager switches control on the device from the primary BIOS chip to a backup BIOS chip.

In an embodiment, at 321, the BIOS manager uses a hardware switch that switches control from the primary BIOS chip to the backup BIOS chip.

At 330, the BIOS manager executes a backup BIOS from the backup BIOS chip. The backup BIOS causes restoration of the primary BIOS from a recovery BIOS located on a secure partition of the hard drive and reboots the device to provide control back to the primary BIOS chip having the restored primary BIOS.

In an embodiment, at 331, the backup BIOS loads a recovery OS from the secure partition of the hard drive.

In an embodiment of 331 and at 332, the recovery image processes a BIOS reflash application.

In an embodiment of 332 and at 333, the BIOS reflash application obtains the recovery BIOS from the secure partition.

In an embodiment of 333 and at 334, the BIOS reflash application flashes (stores and/or writes) the recovery BIOS to the primary BIOS chip and replaces the primary BIOS with the recovery BIOS.

In an embodiment of 334 and at 335, the BIOS reflash application forces a reboot of the device.

In an embodiment of 335 and at 336, BIOS manager executes the primary BIOS from the primary BIOS chip, the primary BIOS represents the recovery BIOS on the primary BIOS chip during the reboot.

In an embodiment of 336 and at 337, the primary BIOS loads the primary OS image from the primary partition.

In an embodiment, at 340, the BIOS manager is processed (starting at 310) each time the primary BIOS becomes corrupted on the device to replace the primary BIOS with the recovery BIOS.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   executing a backup Basic Input/Output System (BIOS) from a backup BIOS chip on a dual BIOS chip motherboard;
   loading, by the backup BIOS, a recovery image from a BIOS recovery partition of a hard drive for a device, wherein loading further includes loading a recovery Operating System (OS) from the BIOS recovery partition and executing the recovery OS causing a reflash application to be loaded by the recovery OS, wherein the recovery OS comprises restrictive resource loading functionality;
   executing a reflash application from the recovery image within the recovery OS, wherein executing the backup BIOS further includes activating and passing control by a hardware switch on the device from a primary BIOS chip to the backup BIOS chip when an original primary OS image fails to load a primary OS image from a primary OS partition during a first boot of the device, wherein the hardware switch self-manages when to pass control from the primary BIOS chip to the backup BIOS chip;
   obtaining, by the reflash application, a recovery BIOS from the BIOS recovery partition of the hard drive;
   flashing, by the reflash application, the recovery BIOS onto a primary BIOS chip of the device as a primary BIOS for the device from the dual BIOS chip motherboard;
   rebooting the device; and
   processing the method while the device lacks any network connection.

2. The method of claim 1 further comprising:
   executing the primary BIOS;
   loading, by the primary BIOS, a primary OS image from a primary OS partition of the hard drive; and
   executing a primary OS and applications from the primary OS image.

3. The method of claim 2 further comprising, preventing access to the BIOS recovery partition from processes of the primary OS and from the applications of the primary OS image.

4. The method of claim 3 further comprising, executing the primary BIOS from the primary BIOS chip on subsequent reboots of the device.

5. The method of claim 4, wherein executing the primary BIOS further includes iterating back to executing the backup BIOS from the backup BIOS chip during any of the subsequent reboots when the primary OS image fails to load from the primary OS partition and resetting the primary BIOS with the recovery BIOS.

6. The method of claim 1, wherein loading further includes maintaining the BIOS recovery partition as a secure and hidden partition on the hard drive of the device that is inaccessible to a primary OS image loaded from a primary OS partition of the hard drive.

7. A method, comprising:
   detecting on a primary BIOS chip of a device a failure of a primary Basic Input/Output System (BIOS) to load a primary Operating System (OS) image from a primary partition of a hard drive of the device, wherein the primary BIOS chip resides on dual BIOS chip motherboard;
   switching, by a hardware switch of the dual BIOS chip motherboard, control on the device from the primary BIOS chip to a backup BIOS chip by loading a recovery OS from a secure partition of the hard drive causing the recovery OS to load and process a reflash application from the secure partition, wherein the recovery OS comprises restrictive resource loading functionality, wherein the hardware switch self-manages when to pass control from the primary BIOS chip to the backup BIOS chip;
   executing, by the reflash application, a backup BIOS from the backup BIOS chip that restores the primary BIOS from a recovery BIOS on the secure partition of the hard drive and that reboots the device to provide control back to the primary BIOS chip, wherein the backup BIOS chip resides on the dual BIOS chip motherboard; and
   processing the method while the device lacks any network connection.

8. The method of claim 7, wherein executing further includes loading, by the backup BIOS, a recovery image from the secure partition of the hard drive.

9. The method of claim 8, wherein loading further includes processing the reflash application within the recovery OS.

10. The method of claim 9, wherein processing further includes obtaining, by the reflash application, the recovery BIOS from the secure partition.

11. The method of claim 10, wherein obtaining further includes flashing, by the reflash application, the recovery BIOS to the primary BIOS chip and replacing the primary BIOS with the recovery BIOS.

12. The method of claim 11, wherein flashing further includes forcing, by the reflash application, a reboot of the device.

13. The method of claim 12, wherein forcing further includes executing the primary BIOS from the primary BIOS chip, wherein the primary BIOS represents the recovery BIOS during the reboot.

14. The method of claim 13, wherein executing the primary BIOS further includes loading, by the primary BIOS, the primary OS image from the primary partition.

15. The method of claim 7 further comprising, processing the method each time the primary BIOS becomes corrupted on the device to replace the primary BIOS with the recovery BIOS.

16. A device, comprising:

a dual Binary Input/Output System (BIOS) chip motherboard comprising a first BIOS chip and a second BIOS chip;

the first BIOS chip comprising a primary BIOS;

the second BIOS chip comprising a backup BIOS;

a hard drive comprising:

a primary partition comprising a primary Operating System (OS) image;

a BIOS recovery partition comprising a recovery image, wherein the recovery image comprises a recovery OS, a reflash application, and a recovery BIOS; and a hardware switch configured to pass control of a processor from the first BIOS chip to the second BIOS chip when the primary BIOS fails to load the primary OS image from the primary partition during a boot of the device, wherein the hardware switch self-manages when control of the processer is passed from the first BIOS chip to the second BIOS chip;

wherein the backup BIOS when executed from the second BIOS chip is configured to load the recovery OS from recovery image from the BIOS recovery partition causing the recovery OS to load and execute the reflash application, wherein the reflash application is configured to: obtain the recovery BIOS from the BIOS recovery partition, write/flash the recovery BIOS onto the first BIOS chip as a new primary BIOS, and force a reboot of the device;

wherein during the reboot, the new primary BIOS is configured to execute from the first BIOS chip and load the primary OS image from the primary partition;

wherein the device is configured to write/flash the recovery BIOS onto the first BIOS chip as the new primary BIOS and force the reboot while the device lacks or is without any network connection.

17. The device of claim 16, wherein the device is a Self-Service Terminal (SST), a Point-of-Sale (POS) terminal, a kiosk, or an Automated Teller Machine (ATM).

\* \* \* \* \*